United States Patent
Huang

(10) Patent No.: US 12,540,038 B2
(45) Date of Patent: Feb. 3, 2026

(54) AUTOMATIC TUNING AND CONTROL OF A LINEAR DRIVE BASED INDEPENDENT CART SYSTEM WITH INITIAL VALUE COMPENSATION

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 919 days.

(21) Appl. No.: 17/828,737

(22) Filed: May 31, 2022

(65) Prior Publication Data

US 2023/0382650 A1  Nov. 30, 2023

(51) Int. Cl.
  *B65G 43/00*   (2006.01)
  *B65G 35/06*   (2006.01)
  *B65G 54/02*   (2006.01)

(52) U.S. Cl.
  CPC ............. *B65G 43/00* (2013.01); *B65G 35/06* (2013.01); *B65G 54/02* (2013.01); *B65G 2203/0283* (2013.01); *B65G 2203/0291* (2013.01)

(58) Field of Classification Search
  CPC ........ B65G 43/00; B65G 54/02; G05B 19/33; G05B 2219/41337; H02P 6/006; H02P 25/06; H02P 29/028
  See application file for complete search history.

(56) References Cited

U.S. PATENT DOCUMENTS

| | | | |
|---|---|---|---|
| 2019/0078950 A1 | 3/2019 | Huang et al. | |
| 2021/0088081 A1 | 3/2021 | Huang et al. | |
| 2022/0063924 A1 | 3/2022 | Huang et al. | |
| 2023/0347949 A1* | 11/2023 | Huang | ............... B61L 23/34 |
| 2023/0382650 A1* | 11/2023 | Huang | ............... B65G 54/02 |

(Continued)

FOREIGN PATENT DOCUMENTS

| | | |
|---|---|---|
| EP | 3462598 A1 | 4/2019 |
| EP | 3537247 A2 | 9/2019 |

(Continued)

OTHER PUBLICATIONS

European Search Report for Application No. 23173385.8 dated Oct. 24, 2023 (13 pages).

*Primary Examiner* — John Kwon
(74) *Attorney, Agent, or Firm* — Boyle Fredrickson, S.C.

(57) ABSTRACT

A controller for a linear drive system includes compensation of a reference signal as the mover approaches a commanded position along a track. The compensation value is added once as the vehicle approaches the commanded position, adjusting the reference signal. This compensation allows the controller to resolve to a zero reference signal at the same time the vehicle reaches the commanded position. The amount of compensation required may be automatically determined for a particular vehicle to reduce or eliminate overshoot as the vehicle approaches a station. Initially, no compensation is provided and the controller monitors settling error as the vehicle approaches a station. The compensation value is then incremented and the controller again monitors settling error as the vehicle approaches a station. The controller compares the new settling error to the prior settling error and adjusts the compensation value accordingly.

18 Claims, 11 Drawing Sheets

(56) References Cited

U.S. PATENT DOCUMENTS

| | | | |
|---|---|---|---|
| 2024/0006972 A1* | 1/2024 | Perreault | H02K 41/02 |
| 2024/0359324 A1* | 10/2024 | Huang | B25J 9/162 |
| 2024/0359325 A1* | 10/2024 | Huang | B25J 5/02 |
| 2025/0128897 A1* | 4/2025 | Lu | H02K 41/031 |
| 2025/0145374 A1* | 5/2025 | Huang | B65G 1/0492 |

FOREIGN PATENT DOCUMENTS

| | | |
|---|---|---|
| EP | 3869284 A1 | 8/2021 |
| WO | 2012056844 A1 | 5/2012 |

* cited by examiner

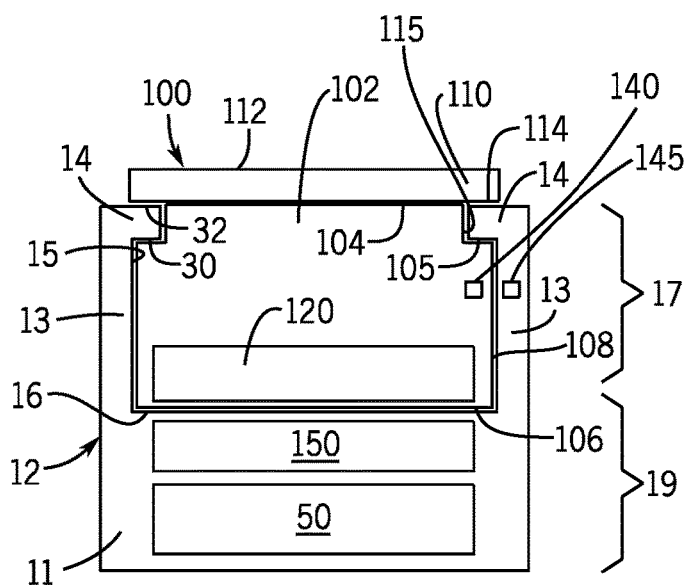
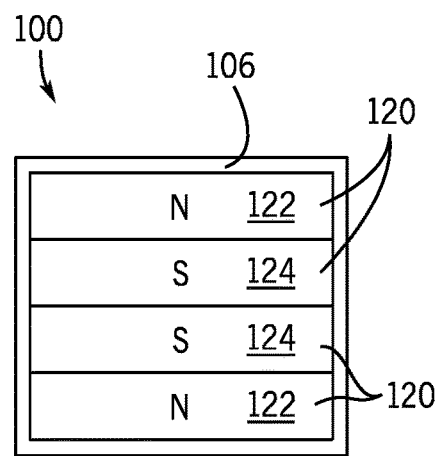
FIG. 2
FIG. 3
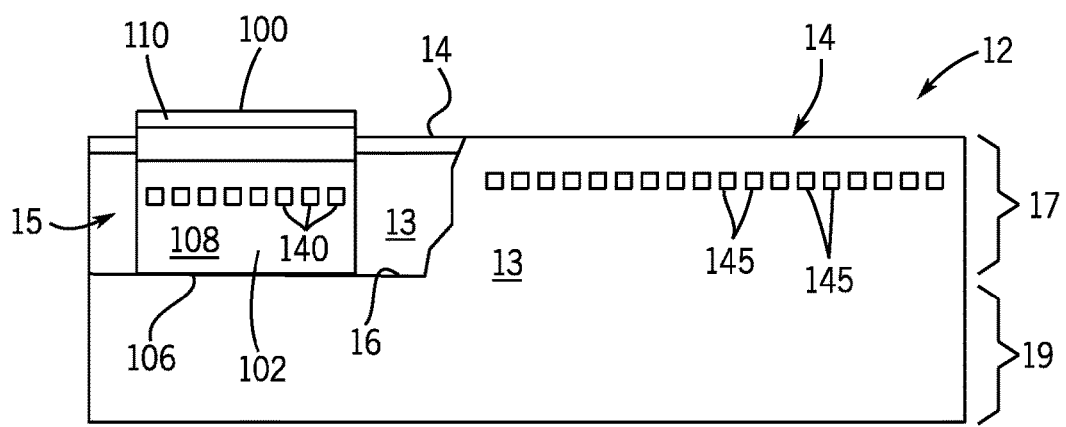
FIG. 4

AUTOMATIC TUNING AND CONTROL OF A LINEAR DRIVE BASED INDEPENDENT CART SYSTEM WITH INITIAL VALUE COMPENSATION

BACKGROUND INFORMATION

The subject matter disclosed herein relates to automatic tuning and control of a linear drive system and, more specifically, to automatically adjusting initial value compensation for a controller in the linear drive system.

Motion control systems utilizing movers and linear drives in an independent cart system can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, or "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

An independent cart system is typically selected to improve throughput over a conventional conveyor belt system. The linear drive system is able to provide extremely high-speed movement and precise positioning of individual carts for interaction between actuators at different stations along the track and a payload located on the mover. This high-speed movement is not accomplished, however, without certain disadvantages. When decelerating a mover from traversal to a stop at a station along the track, it is desirable to maintain traversal speed for as long as possible and decelerate as quickly as possible to achieve maximum throughput. Rapid deceleration, however, typically results in overshoot of a desired position. The controller then requires some settling time to bring the mover back to the desired position after the overshoot and may experience some oscillation back-and-forth around the desired position until the controller brings the mover to a stop at the desired position. The overshoot and subsequent settling of the mover may add seconds to a mover arriving at the desired position. While such settling may be acceptable in some applications, in high-throughput applications, this additional settling time may significantly reduce throughput of the independent cart system.

Historically, it was known to reduce settling time by reducing the rate of deceleration. With a reduced deceleration rate, the controller is able to bring the mover to a stop at the desired position either without overshoot or with minimal overshoot. Although overshoot and oscillation may be reduced or eliminated, the reduced rate of deceleration will require a mover to travel at a slower traversal speed or start decelerating sooner in order to stop at the desired position. Reducing traversal speed and decelerating earlier will both reduce throughput in the linear drive system.

Thus, it would be desirable to provide an improved control system to reduce overshoot and settling time in an independent cart system with little or no impact on the throughput of the independent cart system.

BRIEF DESCRIPTION

A linear drive system for an independent cart system has at least one mover, a track, a memory device, and a controller. The mover includes a first drive member for the linear drive system, and the track includes a second drive member for the linear drive system. The first and second drive members interact with each other to propel the mover along the track. The memory device is configured to store a compensation value. The controller is operative to control operation of the second drive member to position the at least one mover at a desired position along the track and to compare a value of an active command signal to a value of an active feedback signal to generate a value of an error signal. The controller is further configured to execute a control loop on the value of the error signal to obtain a value of a reference signal and read the compensation value from the memory device. The compensation value is neither a function of the value of the active command signal nor a function of the active feedback signal. The controller adds the compensation value to the value of the reference signal to obtain a modified reference signal and uses the modified reference signal to control operation of the at least one mover.

A method for controlling operation of at least one mover in an independent cart system includes generating an active command with a controller for the at least one mover to travel to a desired position along a track for the independent cart system and receiving an active feedback signal at the controller, where the active feedback signal corresponds to the active command. An error signal is determined as a difference between the active command and the active feedback signal with the controller. The error signal is provided to a control loop within the controller, and a reference signal is generated with the control loop as a function of the error signal. A compensation value is read from a memory in communication with the controller. The compensation value is neither a function of the active command nor a function of the active feedback signal. The compensation value is added to the reference signal to generate a modified reference signal, and the modified reference signal is used to control operation of the at least one mover.

A method for controlling operation of at least one mover in an independent cart system includes adding a compensation value to a reference signal within a controller for the at least one mover when the at least one mover arrives at a desired location along a track of the independent cart system in response to a motion command. A maximum amplitude of a settling error is determined for the at least one mover arriving at the desired location, and the maximum amplitude of the settling error is compared to a stored amplitude of the settling error with the controller. When the maximum amplitude is greater than the stored amplitude, the compensation value is adjusted to a new compensation value. When the at least one mover next arrives at the desired location, the new compensation value is added to the reference signal within the controller for the at least one mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
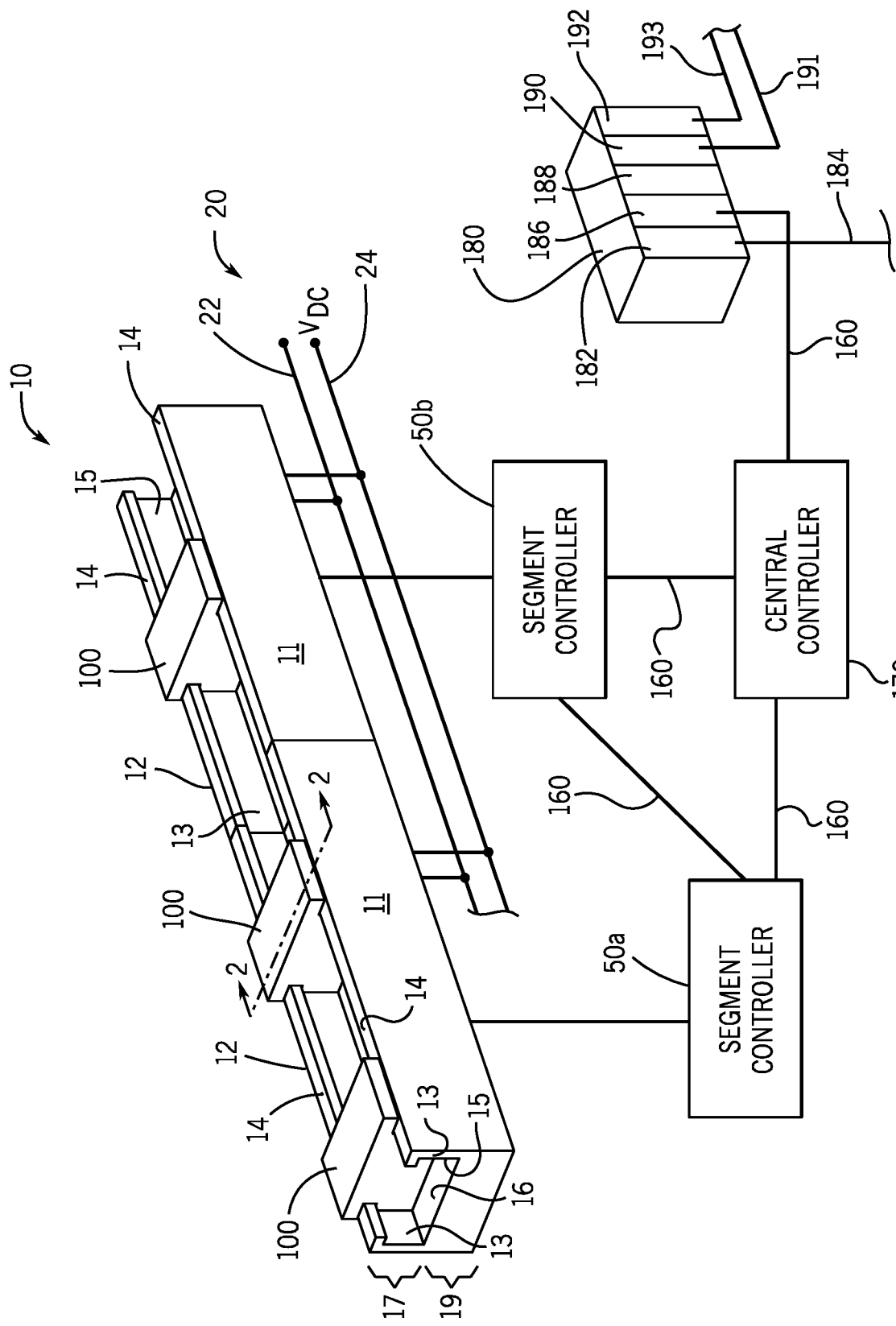
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved control system to reduce overshoot and settling time in an independent cart system with little or no impact on the throughput of the independent cart system. As discussed above, one advantage of an independent cart system is increased throughput for product in an industrial environment, such as manufacturing, packaging, and the like. In order to obtain higher throughput, the linear drive system is typically configured to drive each vehicle along the track at a high rate of speed and to accelerate and decelerate rapidly. The high velocity and high acceleration/deceleration reduce travel times between stations in the independent cart system. However, transitioning from a high velocity to stopped at a commanded position with a rapid deceleration rate can result in some overshoot and settling delay as a vehicle approaches the commanded position.

The overshoot and settling error is generated from a controller which requires some error in order to respond. A controller compares a feedback signal, corresponding to the present position of a vehicle along the track, to a command signal, corresponding to a desired position of the vehicle along the track, and determines a tracking error based on the feedback and command signals. Based on the tracking error, the controller then generates a reference signal for a current regulator to output current along the track in order to control operation of the vehicle to reach the desired position. As a vehicle reaches a commanded position, the controller detects zero tracking error. However, the controller has some lag in responding to the zero error and continues commanding current for a short time after reaching the commanded position. As a result, the vehicle will overshoot the commanded position by a small amount and begin generating tracking error with the opposite polarity from when it was approaching the commanded position. The controller reacts to the new tracking error and commands the mover to return to the commanded position. This overshoot may occur once or multiple times with reduced magnitude each time on opposite sides of the commanded position until the controller is able to bring the vehicle to a stop at the commanded position.

The present invention adds a compensation value to the reference signal as the vehicle approaches the commanded position. This process of adding the compensation value is referred to herein as Initial Value Compensation (IVC). The compensation value is added one time as the vehicle approaches the commanded position, adjusting the reference signal. This compensation offsets the tendency for the controller to add additional current for a short period after reaching the commanded position and allows the controller to resolve to a zero reference signal at the same time the vehicle reaches the commanded position. As a result, the overshoot and resulting settling time is significantly reduced or eliminated.

The amount of compensation required may be influenced by a number of variables, such as which vehicle is approaching the station, the speed at which the vehicle approaches, the deceleration rate of the vehicle, loading of the vehicle, mechanical variations along the track and the like. Thus, it is desirable to provide a method to automatically determine the amount of compensation required for a particular vehicle to reduce or eliminate overshoot as the vehicle approaches a station. The present invention provides for automatic tuning of the IVC. Initially, no compensation is provided as the vehicle approaches a station. The controller monitors a magnitude of the settling error as the vehicle arrives at the station with no compensation. The compensation value is increased by a predefined amount for the next time the vehicle arrives at the same station. The controller again monitors the magnitude of settling error as the vehicle arrives at the station with some compensation. If the magnitude of settling error is reduced, the correct polarity of compensation has been added. If the magnitude of settling error increases, the incorrect polarity of compensation was added, and the controller reverses the polarity. As long as some magnitude of settling error exists, the controller will incrementally increase the amount of compensation for each subsequent approach by the vehicle to the same station, and the controller will continue to increase the amount of compensation as long as the magnitude of settling error is decreasing. Once the settling error reaches zero, or near zero, some value of compensation will cause undershoot, or stopping short of the commanded position. The magnitude of settling error will then begin to increase. When the controller detects the increase in settling error, the compensation value is returned to its prior value and stored by the controller as the desired value of compensation for the IVC by that vehicle at a particular station. The controller may determine compensation values for each mover and station along a track.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel back iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
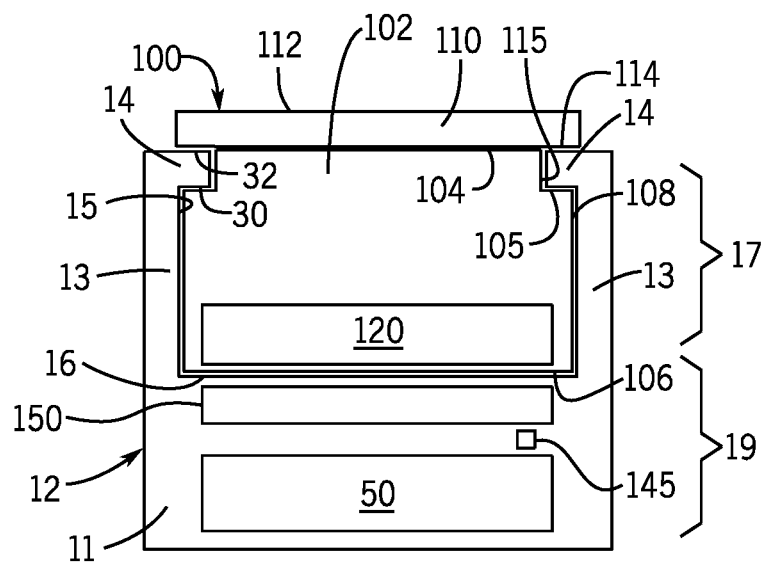
FIG. 5 is a sectional view of another embodiment of a mover and track segment included in the linear drive system taken at 2-2 of FIG. 1.
Figure 7:
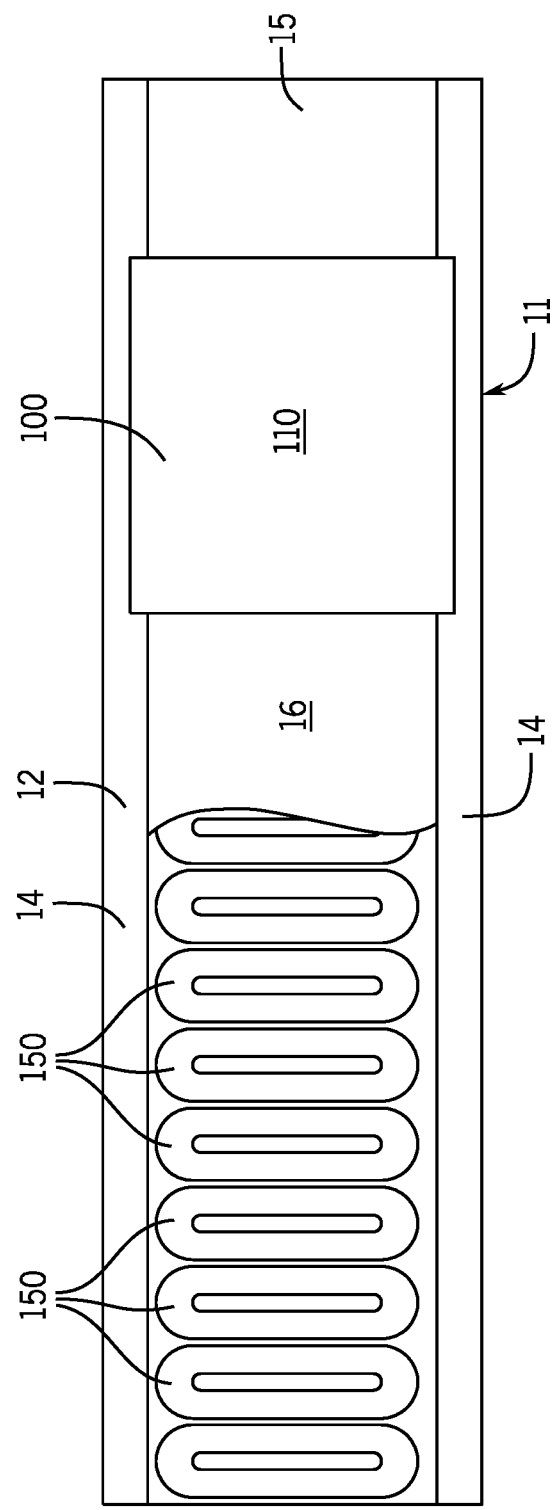
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
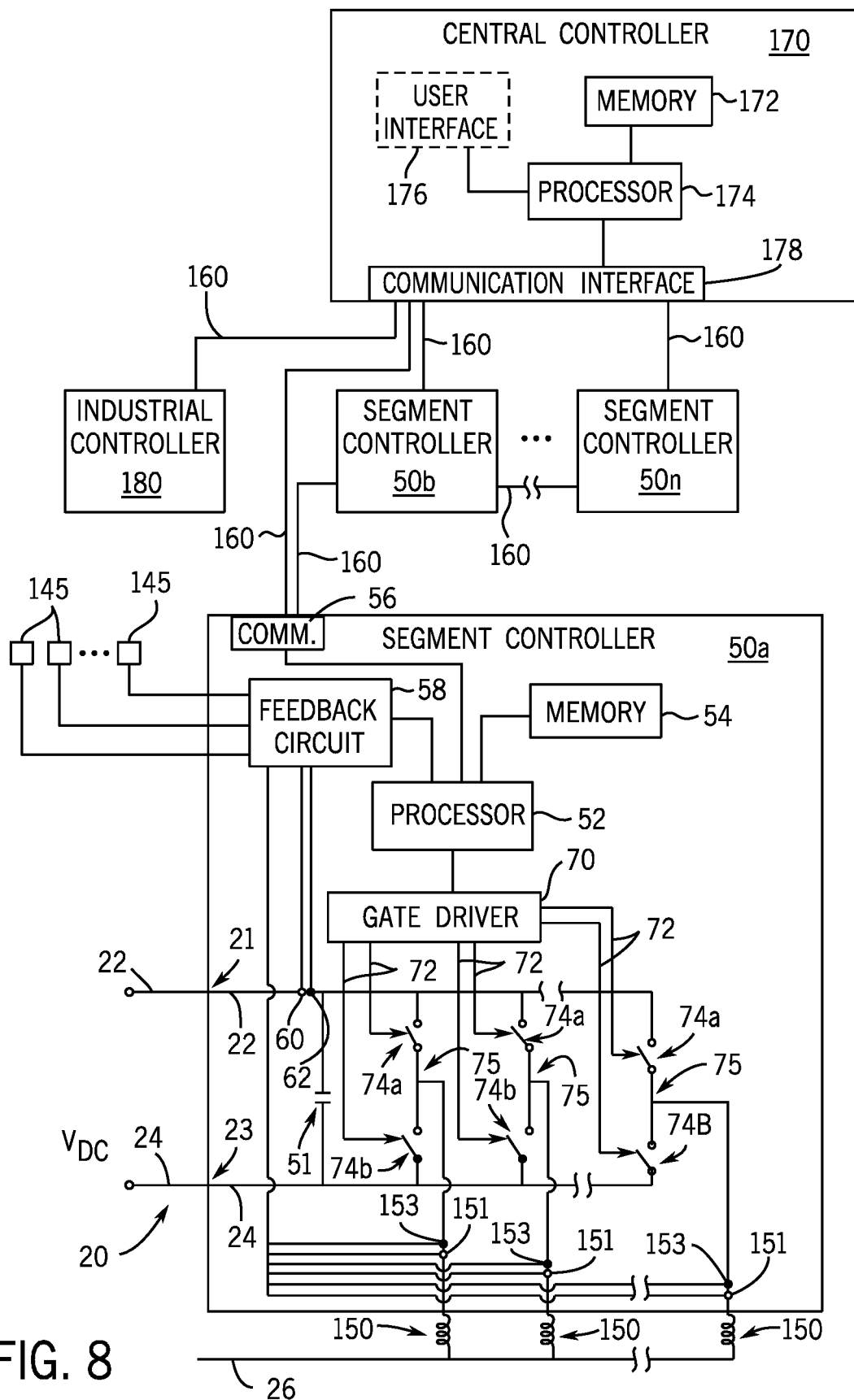
FIG. 8 is a block diagram representation of one embodiment of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
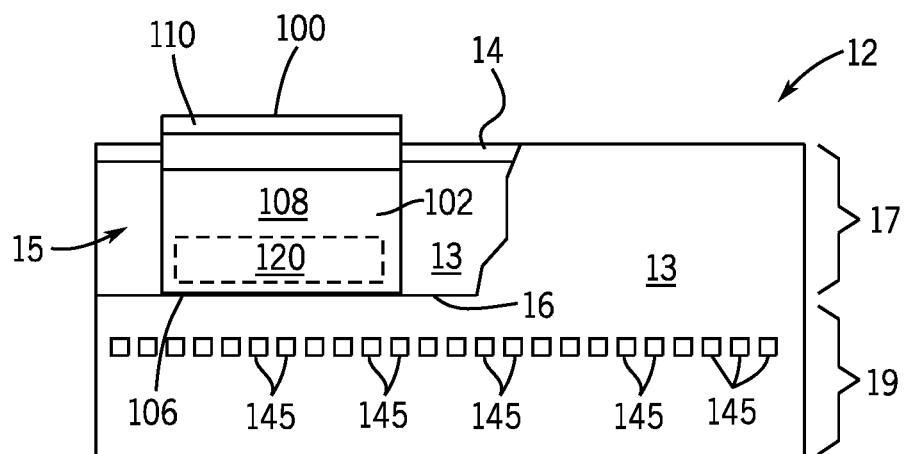
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24. According to the embodiment illustrated in FIG. 8, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

Figure 9:
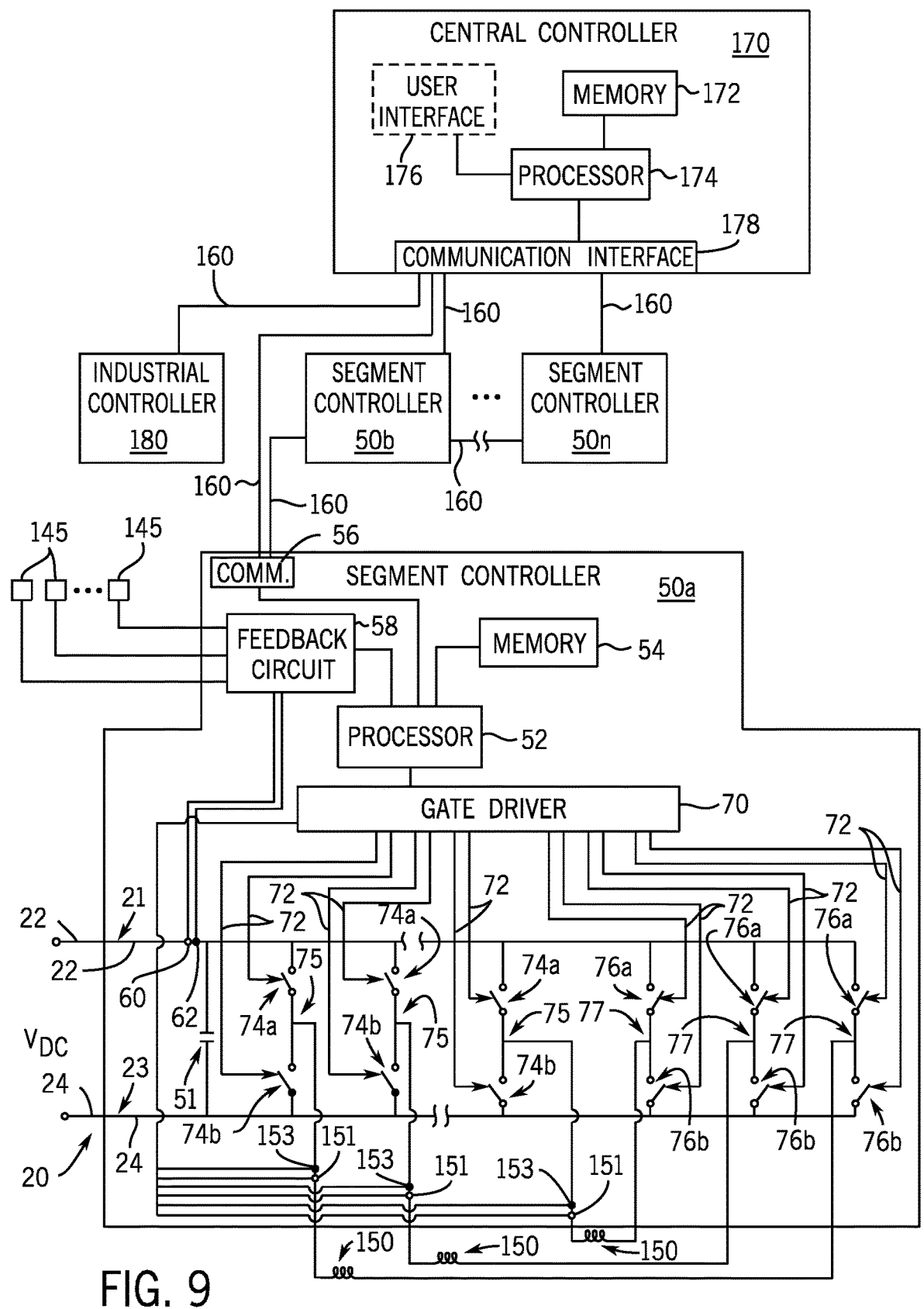
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 150 extending along the track segment 12. Each leg includes a first switching device 74a and a second switching device 74b connected in series on one side of the coil 150. The first and second switching devices 74a, 74b are connected between the positive rail 22 and the negative rail 24 with a first common connection 75 between the first and second switching devices 74a, 74b. The first common connection 75 is connected to the first side of the coil 150. Each leg further includes a third switching device 76a and a fourth switching device 76b connected in series on the other side of the coil 150. The third and fourth switching devices 74a, 74b are connected between the positive rail 22 and the negative rail 24 with a second common connection 77 between the first and second switching devices 74a, 74b. The second common connection 77 is connected to the second side of the coil 150. The first and third switching devices 74a, 76a in each leg may also be referred to herein as upper switches, and the second and fourth switching devices 74b, 76b in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off. Each of switching devices 74, 76 may further include a diode connected in a reverse parallel manner between the first or second common connection 75, 77 and either the positive or negative rail 22, 24.

With reference again to FIG. 8, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. With reference also to FIG. 9, it is contemplated that the feedback signals from the current sensor 151 and/or the voltage sensor 153 corresponding to the operation of the coils 150 may be provided to a dedicated current regulator device. As shown in FIG. 9, the feedback signals are provided directly to the gate driver 70 which would, in turn, regulate the current output to each coil and generate the switching signals 72 accordingly. The energized coils 150 create an electromagnetic field that interacts with the drive magnets 120 on each mover 100 to control motion of the movers 100 along the track segment 12.

Figure 10:
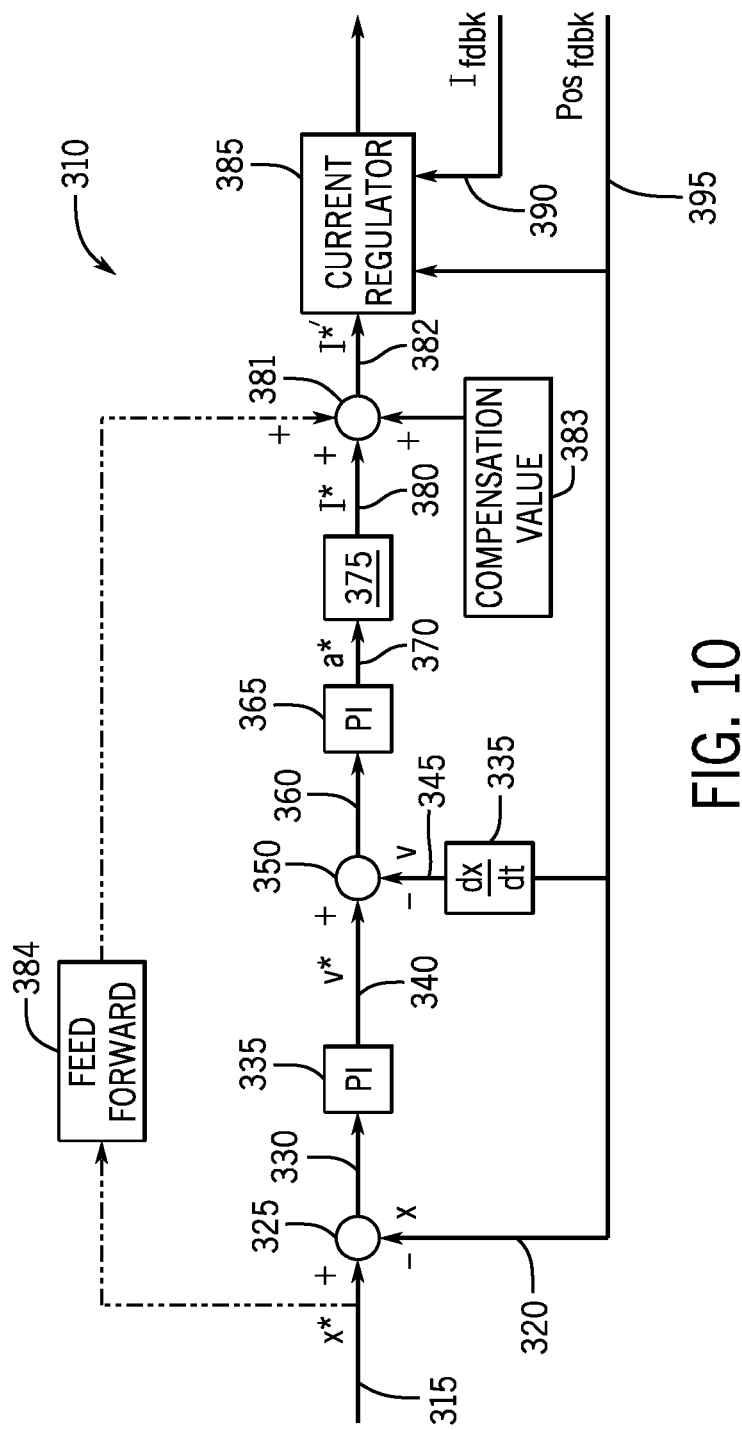
FIG. 10 is an exemplary control module included for execution on a segment controller according to one embodiment of the invention.

In operation, each track segment 12 is configured to control operation of each mover 100 present on the track segment 12. The segment controller 50 receives a command signal corresponding to the desired operation of each mover 100 and controls the current output to each coil 150 to achieve the desired operation. With reference to FIG. 10, one implementation of a control module 310 executable by the segment controller 50 is illustrated. The control module 310 receives a position command signal, x*, 315 as an input. The position command signal, x*, is compared to a position feedback signal, x, 320 at a first summing junction 325. A position error signal 330 is output from the first summing junction 325 and input to a position loop controller 335. According to FIG. 10, the position loop controller 335 includes a proportional and an integral (PI) controller.

Optionally, the position loop controller 335 may be just a proportional (P) controller or further include a derivative (D) controller. Each of the proportional (P), integral (I), and/or derivative (D) controllers of the position loop controller 335 includes a controller gain value. The controller gain values are commonly referred to as a proportional gain (Kpp), integral gain (Kpi), and a derivative gain (Kpd). The output of the position loop controller 335 is a velocity reference signal, v*, 340.

The velocity reference signal, v*, 340 is compared to a velocity feedback signal, v, 345 at a second summing junction 350. The velocity feedback signal, v, 345 is generated by a derivative block 355 acting on the position feedback signal 320. A velocity error 360 signal is output from the second summing junction 350 and input to a velocity loop controller 365. According to FIG. 10, the velocity loop controller 365 includes a proportional and an integral (PI) controller. Optionally, the velocity loop controller 365 may be just a proportional (P) controller or further include a derivative (D) controller. Each of the proportional (P), integral (I), and/or derivative (D) controllers of the velocity loop controller 365 includes a controller gain value. The controller gain values are commonly referred to as a proportional gain (Kvp), integral gain (Kvi), and a derivative gain (Kvd). The output of the velocity loop controller 365 is an acceleration reference signal, a*, 370.

The acceleration reference signal 370 is passed through an additional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 50.

The current reference, I*, 380 is provide to a third summing junction 381. The compensation value 383 for IVC is also provided to the third summing junction 381. This compensation value 383 is added to the current reference, I*, 380 as will be discussed in more detail below. According to the illustrated embodiment, an optional feedforward signal is also provided to the third summing junction 381. The feedforward signal is generated by multiplying the position command signal, x*, 315 with a feedforward gain 384. The output of the third summing junction 381 is a modified current reference, I*', 382. Thus, the compensation value 383 is not acted on by the position or velocity control loops 335, 365 but rather is applied directly to the current reference signal 380.

The modified current reference, I*', 382 is, in turn, passed to a current regulator 385, which controls the current supplied to each coil 150 on the track segment. The current regulator 385 receives current feedback signals 390 from the current sensors 305 and position feedback information 395 identifying the position of each mover 100. Because a mover 100 may span multiple coils 150, the current regulator 385 determines an appropriate current for each coil 150 to produce the force desired to control the mover as indicated by the modified current reference, I*', 382 and determines a resultant current desired for each coil 150. The current regulator 385 uses the current and position feedback information, 390 and 395, to regulate the current to each coil 150, accordingly.

The output of the current regulator 385 is provided as an input to the gate driver module 70. With reference again to FIGS. 8 and 9, the gate driver module 70 converts the input to a desired output voltage having a variable amplitude and frequency. Having determined the desired output voltage required to produce the commanded input, the gate driver module 70 generates the gating signals 72 according to pulse width modulation (PWM) or by other modulation techniques to control the switching elements 74-77 to produce the desired currents in each coil 150, resulting in the desired motion for each mover 100.

Each segment controller 50 is responsible to control operation of movers 100 present on the corresponding track segment 12 in which the segment controller 50 is located. A control module 310 executes within the controller at a periodic interval. For each periodic interval, a new command signal 315 and new feedback signals 390, 395 are obtained. As used herein, the command signal 315 and feedback signals used during a given cycle will be referred to as the active command signal and the active feedback signal. This is to distinguish from a command signal or feedback signal used during prior intervals of execution. The control module 310 executes based on the active command and active feedback signals to generate a current reference used by the gate driver 70 to output a desired current value for that periodic interval. This process is repeated at each periodic interval to regulate the desired current in each of the coils 150.

When a mover 100 is commanded to stop on a track segment 12, the segment controller 50 uses the compensation value 383 to minimize settling error of the mover 100. Addition of the compensation value 383 is unique within the control module 310 in that it is added to the current reference 380 during execution of the control module 310 for just one periodic interval during each commanded move rather than being added during each cycle of execution. When the mover 100 reaches the desired position, the segment controller 50 adds the compensation value 383 to the current reference, I*, 380. The single addition of the compensation value 383 is configured to provide a "boost" to the current reference, I*, 380 which helps the control module 310 arrive at the commanded position with minimal or no settling error.

Because the compensation value 383 is added just once during each commanded move, the segment controller 50 must determine the appropriate time and/or position along the track at which to add the compensation value 383 to the current reference, I*, 380. According to a first embodiment of the invention, the segment controller 50 monitors the current position of each mover 100 along the track segment 12 as received from the position feedback system. The control module samples the position feedback signal 320 and compares the feedback signal to the desired position in the position command signal 315. When the desired position is within a predefined window of the desired position, the segment controller 50 indicates that the mover 100 is at the desired position. According to one aspect of the invention, the predefined window may be up to ten or twenty millimeters (10-20 mm) from the desired position. According to a preferred aspect of the invention, the segment controller 50 determines that the mover 100 is at the desired position when the mover is within one millimeter (1 mm) of the desired position.

According to another embodiment of the invention, the segment controller 50 uses the current motion profile for a mover 100 to determine when the mover 100 is at the desired position. The current motion profile includes a velocity and deceleration rate for the mover. When the mover 100 is being decelerated, the segment controller 50 detects a minimum speed at which the mover 100 may be commanded before being determined at the desired position. The minimum speed may be determined as a function of the commanded speed and deceleration rate. The minimum speed may be determined based on the relationships between deceleration, velocity, position, and time. The deceleration rate and velocity are determined as part of the motion profile for the mover 100. If, for example, a desired distance of one millimeter from the desired position is the desired position at which to add the compensation value 383, the amount of time required to travel one millimeter beginning at a particular velocity and applying a specific deceleration may be determined. Similarly, the speed at which the mover 100 must be travelling to decelerate from that speed to zero speed over one millimeter of travel based on a given deceleration rate may be determined. This time required or speed threshold may be utilized by the segment controller 50 as an indication of when to add the compensation value 383 to the current reference, I*, 380.

Figure 11:
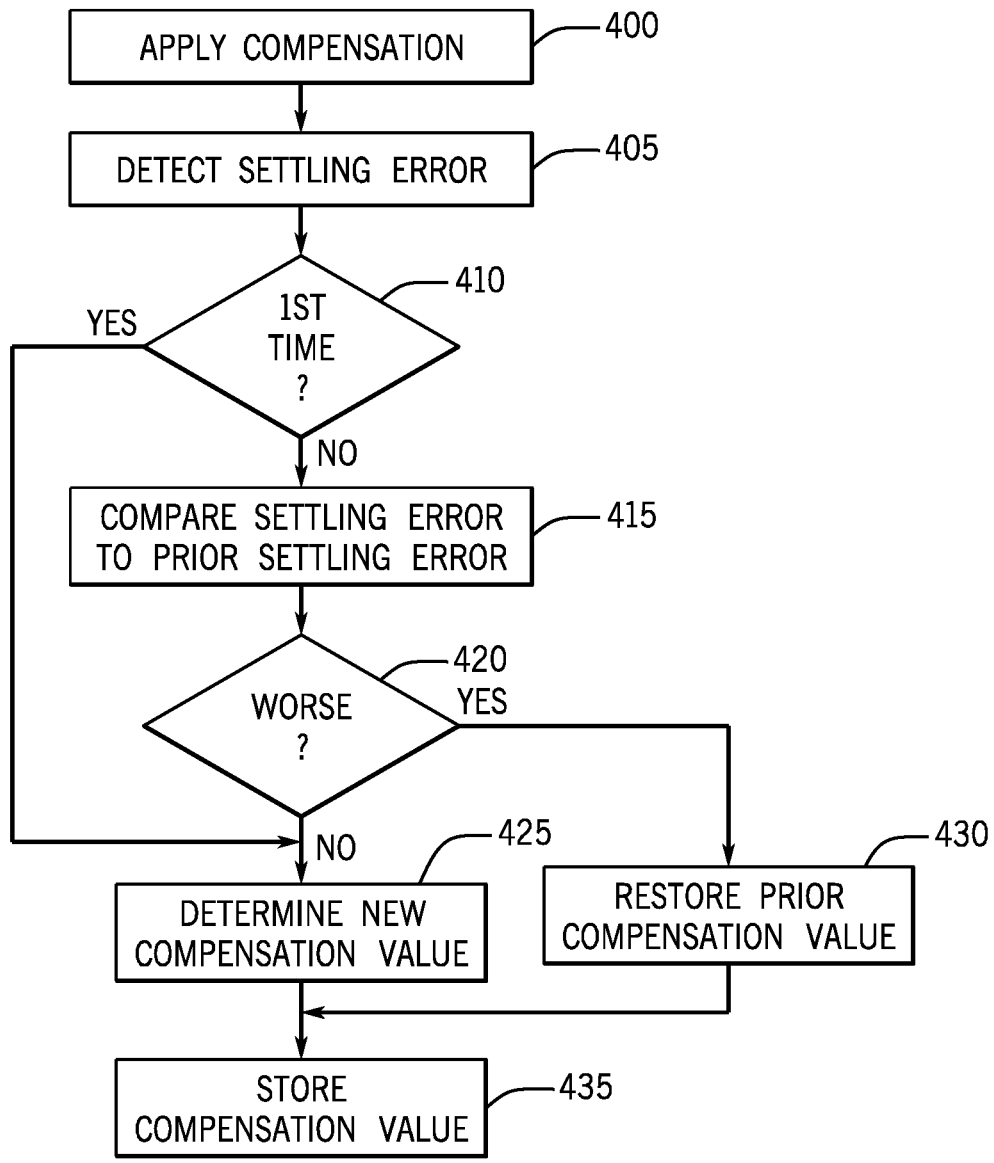
FIG. 11 is a flow diagram illustrating steps used to automatically tune the initial value compensation according to one embodiment of the invention.

With reference next to FIG. 11, steps for automatically tuning the compensation value 383 are illustrated. A mover 100 is commanded to arrive at a desired position along the track 10. When the mover 100 reaches the defined threshold (e.g., distance, speed, time) prior to reaching the desired position, the compensation value 383 is added to the current reference, I*, 380, as shown in step 400. As shown at step 405, the settling error for the mover 100 arriving at the desired position is monitored and a maximum value of the settling error is stored in memory 54. Initially, the compensation value 383 may be set to zero. Optionally, a default value providing a small compensation may be stored in memory 54 of the segment controller 50. At step 410, the segment controller 50 determines whether this is the first time the mover 100 has arrived at a particular position. If so, the maximum settling error determined in this move is the first data point and there is no prior value for comparison. The segment controller 50 may skip down to step 425. If, however, a prior value of the settling error has been stored in memory 54, the segment controller 50 moves down to step 415 and compares the current maximum value of the settling error to the prior maximum value of settling error stored in memory 54. During tuning of the IVC, the compensation value 383 changes between consecutive stops at a given position. Thus, the maximum value of the settling error should similarly change between runs.

At step 420, the segment controller 50 determines if the maximum value of the settling error has gotten worse between successive runs. If this is the first time through the tuning steps or if the maximum value of the settling error decreased, then a new compensation value 383 is determined, as indicated in step 425. For an initial run, the compensation value 383 may be zero or a predefined nominal value. The new compensation value 383 is determined by incrementing or decrementing the compensation value 383 by a desired change amount. The desired change amount may be a parameter setting stored in the memory 54 of the segment controller 50 and may be user configurable via a user interface or via download of parameters on the segment controller 50. Similarly, if this is a second or additional run and the maximum settling error decreased between runs, the compensation value 383 may again be incremented to a new value. Because the prior change improved operation, additional boost is provided to further reduce the setting error. If, however, the maximum value of the settling error increases between runs, this may indicate that a wrong polarity of compensation was initially provided or the compensation value 383 has now increased beyond a beneficial level and has begun to cause undershoot rather than overshoot. As shown in step 430, the prior value of the compensation value 383 is restored, bringing the settling error back to its prior level. If this was an initial check and the maximum value of settling error increased, rather than just restoring the prior value of the compensation value 383, an incorrect polarity for adjusting the compensation value 383 may have been applied, and the prior compensation value 383 may be decremented rather than incremented or incremented rather than decremented in order to begin moving the compensation value 383 in the correct direction. At step 435, the new value for the compensation value 383 is stored in memory 54 of the segment controller 50 and is available for use the next time the mover 100 stops at a particular station.

Figure 12A:
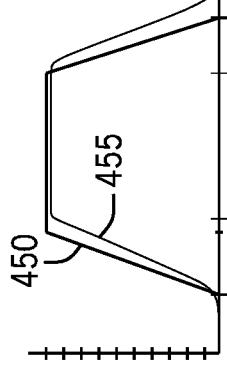
FIG. 12A is a graphical comparison of a position reference with a position feedback signal with respect to time for multiple commanded moves.
Figure 12B:
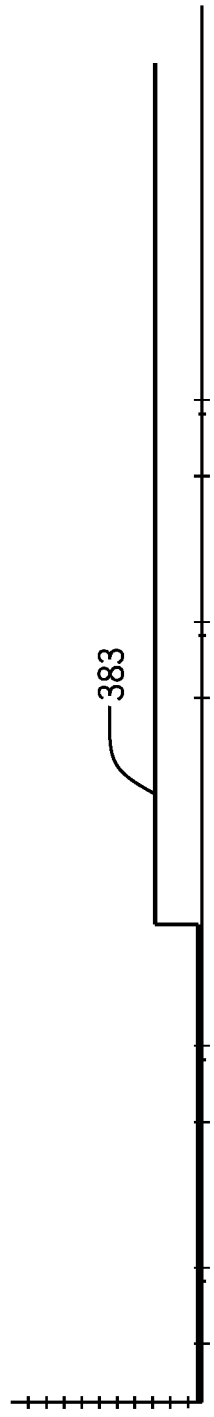
FIG. 12B is a graphical representation of a compensation value used by a controller according to one embodiment of the invention for each of the four commanded moves in FIG. 12A.
Figure 12C:
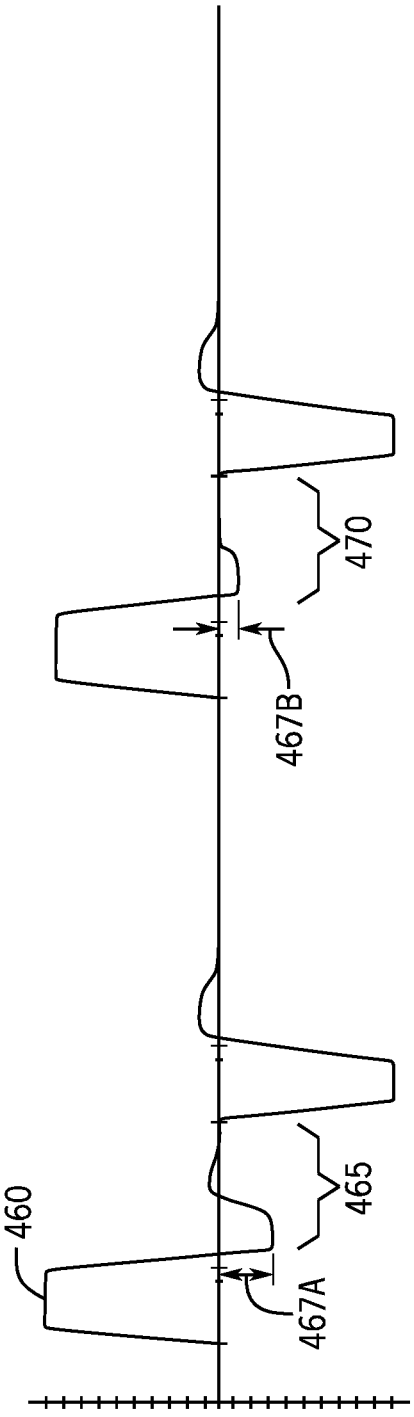
FIG. 12C is a graphical representation of settling error observed by the controller of FIG. 12B during each of the commanded moves in FIG. 12A, where the settling error improves due to the change in the compensation value.
Figure 13A:
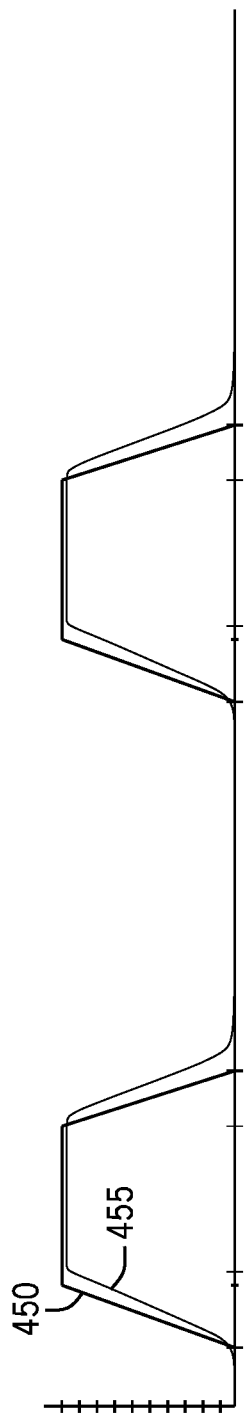
FIG. 13A is a graphical comparison of a position reference with a position feedback signal with respect to time for the same commanded moves of FIG. 12A.
Figure 13B:
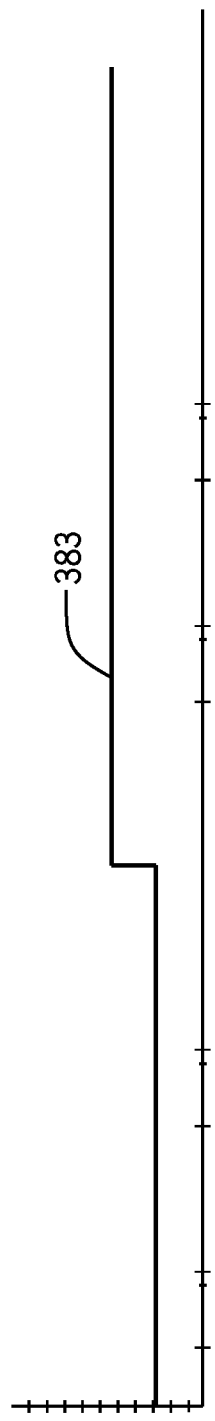
FIG. 13B is a graphical representation of a compensation value used by a controller according to one embodiment of the invention for each of the commanded moves in FIG. 13A.
Figure 13C:
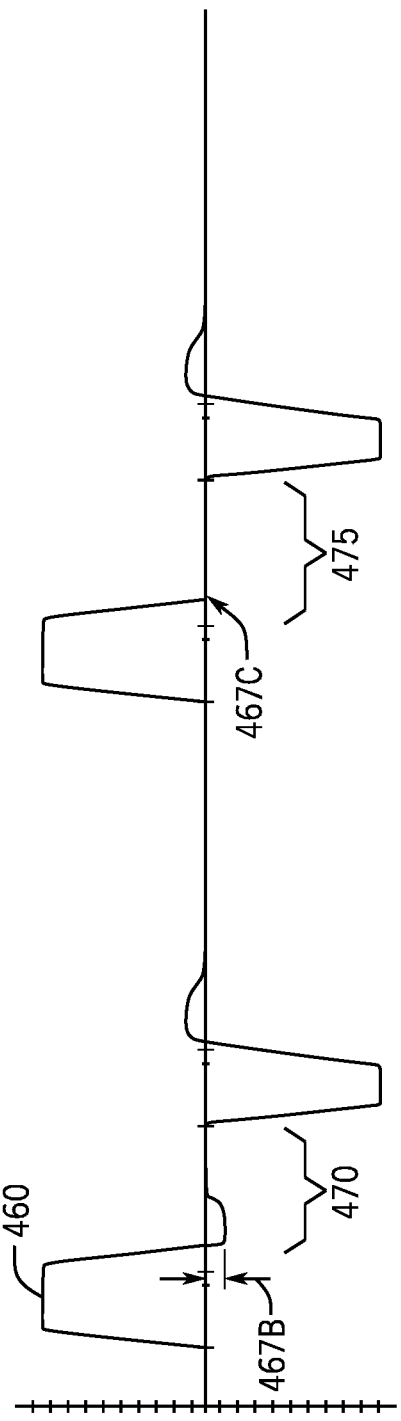
FIG. 13C is a graphical representation of settling error observed by the controller of FIG. 13B during each of the commanded moves in FIG. 13A, where the settling error improves to an ideal value due to the change in the compensation value.

With reference next to FIGS. 12-14, an exemplary series of motion commands being executed by a mover 100 at a desired position along a track 10 are illustrated. In FIG. 12, the initial run and a first subsequent run are illustrated. The motion command 450 is illustrated as a trapezoidal position command. The position feedback signal 455 is plotted along with the motion command 450 in FIG. 12A. As illustrated, a small delay occurs between issuing the motion command 450 and the control module 310 regulating the desired current along the track to cause the mover 100 to follow the motion command. In FIG. 12B the present value of the compensation value 383 is shown, and in FIG. 12C, the following error 460 during the move is plotted.

The first trapezoidal move included in the motion command 450 indicates the mover 100 is to move from a first position (illustrated as zero) to a second position (illustrated as the upper value of the motion command 450). The mover 100 remains at the second position for a short duration and then returns to the first position. Arrival of the mover 100 at the second position is being monitored and tuned to identify the desired compensation value 383 to minimize settling error when arriving at the second position. During the first move, the compensation value 383 is set to zero, corresponding to an initial run. As observed in the time period labelled 465 in FIG. 12C, there is some overshoot by the mover 100 arriving at the second position. The mover 100 first overshoots the desired position and then oscillates around the desired position for a short duration before arriving at the desired position. The maximum value 467A of the settling error with no compensation value is identified. For certain applications, the independent cart system includes tight positioning requirements, for example, to micron positioning accuracy. The delay in arriving at position as a result of the settling error reduces the throughput in the system as the segment controller 50 must wait until the mover 100 has resolved the settling error before indicating that the mover is at the commanded position and allowing external actuators to take action on the mover 100 or on a load present on the mover 100. After measuring the maximum value 467 of the settling error, the segment controller 50 adjusts the value of the compensation value 383. According to the illustrated embodiment in FIG. 12B, the compensation value 383 is incremented from zero to an initial positive value.

FIG. 12 also shows a second trapezoidal move in the motion command 450. The second trapezoidal move is identical to the first trapezoidal move. The mover 100 again moves from the first position (illustrated as zero) to the second position (illustrated as the upper value of the motion command 450). The mover 100 remains at the second position for a short duration and then returns to the first position. Arrival of the mover 100 at the second position is again monitored. The maximum value 467B of the settling error with the newly incremented compensation value 383 is determined during a second duration 470. The maximum value 467B of the settling error during this second run is then compared to the maximum value 467A of the settling error during the first run. As illustrated, the maximum value 467 of the settling error was reduced between the first and second runs indicating an improvement in settling error and a reduced time required by the segment controller 50 to arrive at the commanded position.

Turning next to FIG. 13A, the trapezoidal moves in the motion command 450 are identical to the trapezoidal moves in the motion command 450 shown in FIG. 12A. The first trapezoidal move in FIG. 13 is executed with the compensation value 383 set identically to the value in the second trapezoidal move of FIG. 12. The move is shown with the same compensation value in FIG. 13B to illustrate the tuning steps and for comparison to a new compensation value used in the second move on FIG. 13A. After the initial trapezoidal move in FIG. 13A, the segment controller 50 again increments the compensation value 383. This second increment is observed in FIG. 13B. Another trapezoidal move commands the mover 100 to travel from the first position (illustrated as zero) to the second position (illustrated as the upper value of the motion command 450). The mover 100 remains at the second position for a short duration and then returns to the first position. Arrival of the mover 100 at the second position is again monitored. The maximum value 467C of the settling error with the newly incremented compensation value 383 is determined during a third duration 475. The plots shown in FIG. 13 illustrate an exemplary application in which the adjusted compensation value 383 brings the settling error to zero. In other words, the segment controller 50 is able to bring the mover 100 to the commanded position with no overshoot and no undershoot. This would be the ideal tuning case for adjusting the compensation value 383.

Figure 14A:
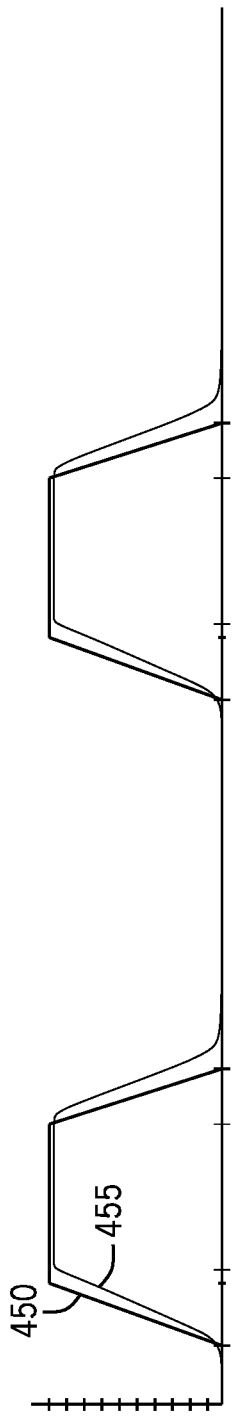
FIG. 14A is a graphical comparison of a position reference with a position feedback signal with respect to time for the same commanded moves of FIG. 12A.
Figure 14B:
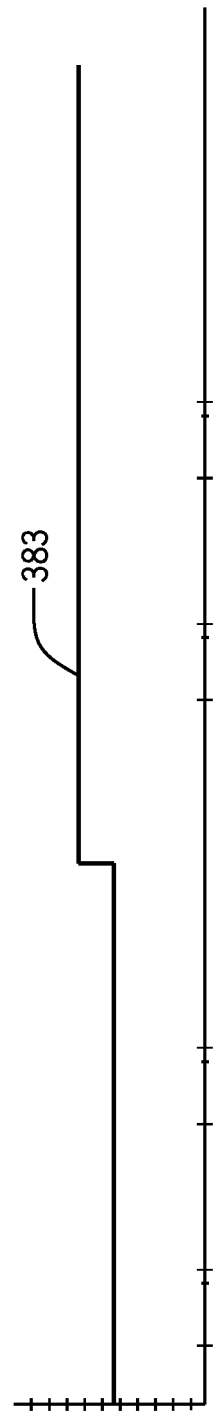
FIG. 14B is a graphical representation of a compensation value used by a controller according to one embodiment of the invention for each of the commanded moves in FIG. 14A.
Figure 14C:
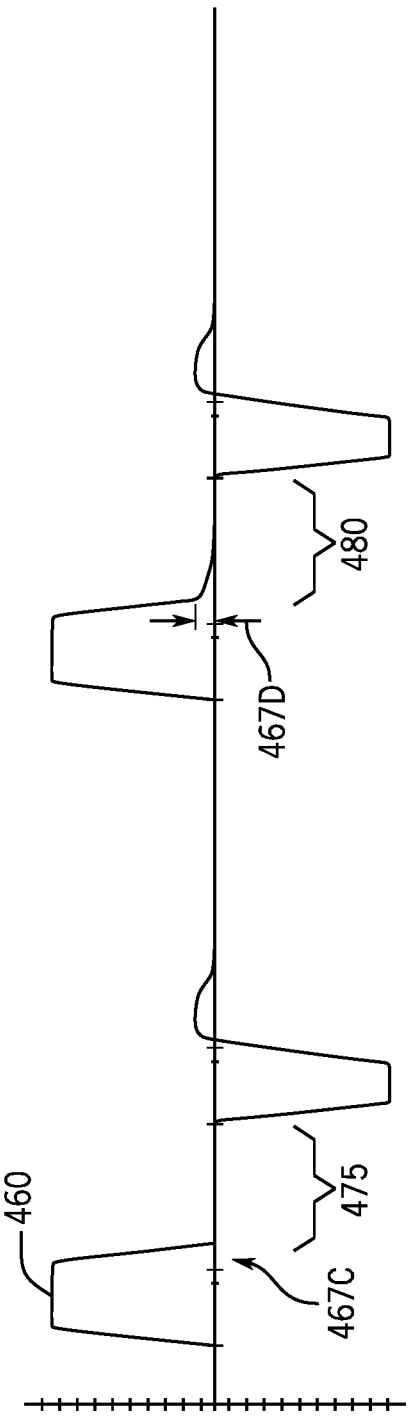
FIG. 14C is a graphical representation of settling error observed by the controller of FIG. 14B during each of the commanded moves in FIG. 14A, where the settling error worsens due to the change in the compensation value.

Turning next to FIG. 14A, the trapezoidal moves in the motion command 450 are agin identical to those used in FIGS. 12A and 13A. The first trapezoidal move in FIG. 14 is executed with the compensation value 383 set identically to the value in the second trapezoidal move of FIG. 13. The move is shown with the same compensation value in FIG. 14B to illustrate the tuning steps and for comparison to a new compensation value used in the second move on FIG. 14A. After the initial trapezoidal move in FIG. 14A, the segment controller 50 again increments the compensation value 383. This third increment is observed in FIG. 14B. Another trapezoidal move commands the mover 100 to move from the first position (illustrated as zero) to the second position (illustrated as the upper value of the motion command 450). The mover 100 remains at the second position for a short duration and then returns to the first position. Arrival of the mover 100 at the second position is again monitored. The maximum value 467D of the settling error with the newly incremented compensation value 383 is determined during a fourth duration 480. As observed in FIG. 14C, the third compensation value now results in undershoot as the mover 100 approaches the desired position. The maximum value 467D of the settling error has changed sign from the first two values 467A, 467B and the mover 100 slows prior to arriving at the desired position and the slowly creeps into position. Undershoot will result in additional throughput time in a similar manner to overshoot and is equally undesirable. The magnitude of the maximum value 467D of settling error during this fourth duration 480 is greater than the magnitude of the maximum value 467C of settling error during the third duration. As a result, the segment controller 50 restores the prior value of the compensation value 383 which resulted in no settling error. The automatic tuning of the compensation value 383 is complete and the resulting compensation value 383 is used for future runs of the mover 100.

According to one aspect of the invention, each mover 100 may be of similar construction to each other and each track segment 12 of similar construction to each other. While there will be some variation between movers 100 and track segments 12 as a result of manufacturing and assembly tolerances, a single compensation value 383 may be used for each mover 100 as it stops at any position along the track 10. Although the compensation value 383 may only be optimized for a single mover at a particular position, the compensation value 383 may still reduce settling time in general for each mover at any position along the track 10. According to another aspect of the invention, a look-up table may be stored in memory 54 of the segment controller 50. The look-up table may include an entry for each mover 100 at each station along the length of the track 10. As the independent cart system operates, the automatic tuning executes for each mover 100 at each position, storing the improved compensation values in the look-up table. As the automatic tuning provides the ideal compensation value 383 for each mover at each station along the track, the settling times for each mover are minimized and throughput in the system is maximized.

According to one aspect of the invention, automatic tuning for IVC may execute for an initial time period. For example, the automatic tuning may be configured to run for one hour, one day, or one week. The selected duration may be a function of the application requirements. For example, a system in which each mover 100 is configured to stop at each station along the track 10 multiple times in a minute may converge to the preferred compensation values 383 within an hour. Another application in which a mover may stop at different stations, for example, as a function of a load present on the mover 100 and in which the application schedules different loads on different days of production may execute for a week in order to optimize compensation values. According to still another aspect of the invention, a difference in the maximum value 467 of settling error between the preferred compensation value and the maximum value of the setline error resulting when the compensation value is one increment away from the preferred compensation value may result in acceptable performance for the independent cart system. In this instance, the automatic tuning for the IVC may be configured to continually operate. During continuous operation and when the system is performing normally, the automatic tuning may toggle between two different compensation values 383. However, with continuous operation, the automatic tuning may also be used to adjust the compensation value 383 based on changes in system performance. For example, the system performance may change as a factor of ambient environment, wear on the mover 100 or track 10, damage to the mover 100 or track 10, or still other changes in operating parameters. Continuous operation of the automatic tuning routine adjusts the compensation value 383 to an ideal value based on the current operating conditions.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A linear drive system for an independent cart system, the linear drive system comprising:
   at least one mover including a first drive member for the linear drive system;
   a track including a second drive member for the linear drive system, wherein the first and second drive members interact with each other to propel the at least one mover along the track;
   a position feedback system mounted to the track and configured to generate a position feedback signal corresponding to a present location of the at least one mover;
   a memory device configured to store a compensation value; and
   a controller operative to:
      identify a desired position at which the at least one mover is to be located,
      control operation of the second drive member to position the at least one mover at the desired position along the track,
      read the position feedback signal,
      compare the position feedback signal to the desired position,
      indicate the at least one mover is at the desired position,
      compare a value of an active command signal to a value of an active feedback signal to generate a value of an error signal,
      execute a control loop on the value of the error signal to obtain a value of a reference signal,
      read the compensation value from the memory device, wherein the compensation value is neither a function of the value of the active command signal nor a function of the active feedback signal,
      add the compensation value to the value of the reference signal once when the at least one mover is at the desired position to obtain a modified reference signal, and
      use the modified reference signal to control operation of the at least one mover.

2. The linear drive system of claim 1, wherein the controller is further operative to indicate the at least one mover is at the desired position when the position feedback signal is within a predefined window of the desired position.

3. The linear drive system of claim 1, wherein the controller is further operative to:
   detect when the at least one mover is being decelerated to stop,
   detect when the at least one mover is traveling at a speed less than a predefined threshold, and
   indicate the at least one mover is at the desired position when the at least one mover is being decelerated to stop and is traveling at the speed less than the predefined threshold.

4. The linear drive system of claim 1, wherein the controller is further operative to measure a maximum value of the error signal for the at least one mover arriving at the desired position.

5. The linear drive system of claim 4, wherein the controller is further operative to:
   store the maximum value of the error signal in the memory device each time the at least one mover arrives at the desired position,
   compare the maximum value of the error signal to a prior stored value for the maximum value of the error signal, and
   adjust the compensation value when a magnitude of the maximum value of the error signal is greater than a magnitude of the prior stored value.

6. The linear drive system of claim 5, wherein the controller is further operative to:
   measure a second maximum value of the error signal for the at least one mover arriving at the desired position after adjusting the compensation value,
   compare the second maximum value to the maximum value of the error signal measured prior to adjusting the compensation value, and
   restore the compensation value to a prior value when the magnitude of the second maximum value is greater than the maximum value of the error signal measured prior to adjusting the compensation value.

7. A method for controlling operation of at least one mover in an independent cart system, the method comprising the steps of:
   identifying a desired position at which the at least one mover is to be located with a controller;
   generating an active command with the controller for the at least one mover to travel to the desired position along a track for the independent cart system;
   receiving an active feedback signal at the controller, the active feedback signal corresponding to the active command;
   determining an error signal as a difference between the active command and the active feedback signal with the controller;
   providing the error signal to a control loop within the controller;
   generating a reference signal with the control loop as a function of the error signal;
   generating a position feedback signal, corresponding to a present location of the at least one mover, with a position feedback system mounted to the track;
   reading the position feedback signal with the controller;
   comparing the position feedback signal to the desired position with the controller;
   indicating the at least one mover is at the desired position;
   reading a compensation value from a memory in communication with the controller, wherein the compensation value is neither a function of the active command nor a function of the active feedback signal;
   adding the compensation value to the reference signal one time to generate a modified reference signal when the at least one mover is at the desired position; and using the modified reference signal to control operation of the at least one mover.

8. The method of claim 7 wherein the controller indicates the at least one mover is at the desired position when the position feedback signal is within a predefined window of the desired position.

9. The method of claim 7, further comprising the steps of:
detecting in the controller when the at least one mover is being decelerated to stop;
detecting in the controller when the at least one mover is traveling at a speed less than a predefined threshold; and
indicating the at least one mover is at the desired position when the at least one mover is being decelerated to stop and is traveling at the speed less than the predefined threshold.

10. The method of claim 7, further comprising the step of measuring a maximum value of the error signal for the at least one mover arriving at the desired position.

11. The method of claim 10, further comprising the steps of:
storing the maximum value of the error signal in the memory each time the at least one mover arrives at the desired position,
comparing the maximum value of the error signal to a prior stored value for the maximum value of the error signal, and
adjusting the compensation value when a magnitude of the maximum value of the error signal is greater than a magnitude of the prior stored value.

12. The method of claim 11, further comprising the steps of:
measuring a second maximum value of the error signal for the at least one mover arriving at the desired position after adjusting the compensation value,
comparing the second maximum value to the maximum value of the error signal measured prior to adjusting the compensation value, and
restoring the compensation value to a prior value when the magnitude of the second maximum value is greater than the maximum value of the error signal measured prior to adjusting the compensation value.

13. A method for controlling operation of at least one mover in an independent cart system, the method comprising the steps of:
reading a position feedback signal with a controller from a position feedback system mounted to the track, wherein the position feedback system is configured to generate the position feedback signal corresponding to a present location of the at least one mover;
comparing the position feedback signal to a desired location;
indicating the at least one mover arrived at the desired location;
adding a compensation value to a reference signal one time within the controller for the at least one mover when the at least one mover arrives at the desired location along a track of the independent cart system in response to a motion command;
determining a maximum amplitude of a settling error for the at least one mover arriving at the desired location with the controller;
comparing the maximum amplitude of the settling error to a stored amplitude of the settling error with the controller;
when the maximum amplitude is greater than the stored amplitude adjusting the compensation value to a new compensation value; and
adding the new compensation value to the reference signal one time within the controller for the at least one mover when the at least one mover next arrives at the desired location.

14. The method of claim 13, wherein:
the compensation value is a first compensation value;
adjusting the first compensation value to a new compensation value further comprises the steps of:
reading the first compensation value from a memory device, wherein the memory device is in communication with the controller;
indexing the first compensation value to a second compensation value; and
storing the second compensation value to the memory device.

15. The method of claim 14, wherein the maximum amplitude of the settling error is a first maximum value of the settling error, the method further comprising the steps of:
adding the new compensation value to the reference signal within the controller for the at least one mover when the at least one mover arrives at the desired location along the track of the independent cart system in response to a second motion command;
determining a second maximum amplitude of the settling error for the at least one mover arriving at the desired location with the controller;
comparing the second maximum amplitude of the settling error to the first maximum amplitude of the settling error; and
when the second maximum amplitude is greater than the first maximum amplitude, returning the compensation value to the first compensation value.

16. The method of claim 13, further comprising the step of reading the compensation value from a memory device, wherein:
the memory device is in communication with the controller,
the memory device is configured to store a plurality of compensation values, and
each of the plurality of compensation values corresponds to a different location along the track.

17. The method of claim 13, wherein the controller indicates
the at least one mover arrived at the desired location when the position feedback signal is within a predefined window of the desired location.

18. The method of claim 13, further comprising the steps of:
detecting when the at least one mover is being decelerated to stop,
detecting when the at least one mover is traveling at a speed less than a predefined threshold, and
indicating the at least one mover arrived at the desired position when the at least one mover is being decelerated to stop and is traveling at the speed less than the predefined threshold.

* * * * *